US009244514B2

(12) United States Patent
Gupta

(10) Patent No.: US 9,244,514 B2
(45) Date of Patent: *Jan. 26, 2016

(54) BODY HEAT SENSING CONTROL APPARATUS AND METHOD

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/440,828

(22) Filed: Apr. 5, 2012

(65) Prior Publication Data

US 2012/0198260 A1    Aug. 2, 2012

Related U.S. Application Data

(63) Continuation of application No. 12/415,067, filed on Mar. 31, 2009, now Pat. No. 8,560,872.

(51) Int. Cl.
*G06F 1/26* (2006.01)
*G06F 1/32* (2006.01)

(52) U.S. Cl.
CPC ............ *G06F 1/3203* (2013.01); *G06F 1/3231* (2013.01); *Y02B 60/1289* (2013.01)

(58) Field of Classification Search
USPC .......................... 713/300, 310, 320, 322, 323
See application file for complete search history.

(56) References Cited

U.S. PATENT DOCUMENTS

| | | | |
|---|---|---|---|
| 5,337,342 A | 8/1994 | Kruger et al. | |
| 5,712,911 A | 1/1998 | Her | |
| 5,917,424 A | 6/1999 | Goldman et al. | |
| 6,237,102 B1 * | 5/2001 | Lee | 713/323 |
| 6,367,020 B1 | 4/2002 | Klein | |
| 6,418,536 B1 | 7/2002 | Park | |
| 6,560,466 B1 | 5/2003 | Skorko | |
| 6,650,322 B2 | 11/2003 | Dai et al. | |
| 6,665,805 B1 * | 12/2003 | Tsirkel et al. | 713/323 |
| 6,735,433 B1 | 5/2004 | Cervantes | |
| 6,821,249 B2 | 11/2004 | Casscells et al. | |
| 6,970,080 B1 | 11/2005 | Crouch et al. | |
| 6,987,454 B2 | 1/2006 | Narayanaswami et al. | |
| 7,010,710 B2 * | 3/2006 | Piazza | 713/323 |
| 7,076,268 B2 | 7/2006 | Blacklock et al. | |
| 7,117,380 B2 * | 10/2006 | Kangas | 713/320 |

(Continued)

OTHER PUBLICATIONS

U.S. Appl. No. 12/258,133; Notice of Allowance dated Mar. 15, 2013; 25 pages.

(Continued)

*Primary Examiner* — Zahid Choudhury
(74) *Attorney, Agent, or Firm* — Swanson & Bratschun, L.L.C.

(57) ABSTRACT

Embodiments of the disclosed invention include a body heat sensing control apparatus and method for automating features of an electronic device based on detection of a user's body heat. For example, in one embodiment, a data processing system is disclosed having a heat sensing mechanism for detecting the body heat of a user. In addition, the data processing system includes a data storage component for storing computer executable instructions and a processing unit for executing the computer executable instructions for enabling a user to configure one or more functions associated with the data processing system that are triggered in response to detecting the presence or absence of the user within the proximity of the data processing system using the heat sensing mechanism.

16 Claims, 5 Drawing Sheets

(56) References Cited

U.S. PATENT DOCUMENTS

| | | | |
|---|---|---|---|
| 7,248,853 | B1 | 7/2007 | Sakarya |
| 7,251,233 | B2 | 7/2007 | Wood |
| 7,342,491 | B2 | 3/2008 | Fujisawa et al. |
| 7,353,413 | B2 | 4/2008 | Dunstan |
| 7,567,659 | B2 | 7/2009 | Kumagai |
| 7,844,677 | B1 | 11/2010 | Asher et al. |
| 8,363,791 | B2 | 1/2013 | Gupta et al. |
| 8,494,482 | B2 | 7/2013 | Gupta |
| 8,494,574 | B2 | 7/2013 | Gupta |
| 8,560,872 | B2 | 10/2013 | Gupta |
| 2001/0024949 | A1 | 9/2001 | Yanagida et al. |
| 2001/0031633 | A1 | 10/2001 | Tuomela et al. |
| 2002/0072348 | A1 | 6/2002 | Wheeler et al. |
| 2003/0051179 | A1 | 3/2003 | Tsirkel et al. |
| 2003/0128114 | A1 | 7/2003 | Quigley |
| 2003/0179094 | A1 | 9/2003 | Abreu |
| 2004/0073827 | A1 | 4/2004 | Tsirkel et al. |
| 2005/0083195 | A1 | 4/2005 | Pham et al. |
| 2005/0181838 | A1 | 8/2005 | Matsuda et al. |
| 2005/0208925 | A1 | 9/2005 | Panasik et al. |
| 2005/0221791 | A1 | 10/2005 | Angelhag |
| 2006/0135139 | A1 | 6/2006 | Cheng et al. |
| 2006/0140452 | A1 | 6/2006 | Raynor et al. |
| 2006/0205517 | A1* | 9/2006 | Malabuyo et al. .............. 463/43 |
| 2007/0032218 | A1 | 2/2007 | Choi |
| 2007/0032225 | A1 | 2/2007 | Konicek et al. |
| 2007/0180282 | A1 | 8/2007 | Kim |
| 2008/0014989 | A1 | 1/2008 | Sandegard et al. |
| 2008/0018480 | A1 | 1/2008 | Sham |
| 2008/0081646 | A1 | 4/2008 | Morin et al. |
| 2008/0158000 | A1 | 7/2008 | Mattrazzo |
| 2008/0304630 | A1 | 12/2008 | Nguyen et al. |
| 2009/0160541 | A1 | 6/2009 | Liu et al. |
| 2009/0254313 | A1 | 10/2009 | Armour et al. |
| 2009/0323919 | A1 | 12/2009 | Toner et al. |
| 2010/0105423 | A1 | 4/2010 | Gupta |
| 2010/0105427 | A1 | 4/2010 | Gupta |
| 2010/0250985 | A1 | 9/2010 | Gupta |
| 2011/0296213 | A1* | 12/2011 | Ferlitsch et al. .............. 713/320 |

OTHER PUBLICATIONS

U.S. Appl. No. 12/258,099; Notice of Allowance dated Mar. 21, 2013; 21 pages.
U.S. Appl. No. 12/258,133; Final Rejection dated Jul. 10, 2012; 20 pages.
U.S. Appl. No. 12/258,133; Non Final Office Action dated Feb. 1, 2012; 19 pages.
U.S. Appl. No. 12/258,133; Final Rejection dated Jun. 8, 2011; 21 pages.
U.S. Appl. No. 12/258,133; Non-Final Rejection dated Dec. 28, 2010; 16 pages.
U.S. Appl. No. 12/258,099; Final Office Action dated Feb. 14, 2012; 18 pages.
U.S. Appl. No. 12/258,099; Non-Final Rejection dated Jun. 24, 2011; 11 pages.
U.S. Appl. No. 12/415,067; Non-Final Rejection dated Sep. 9, 2011; 13 pages.
U.S. Appl. No. 12/415,067; Notice of Allowance dated Apr. 2, 2012; 5 pages.
U.S. Appl. No. 12/415,067; Notice of Allowance dated Jan. 9, 2012; 5 pages.
U.S. Appl. No. 12/415,067; Notice of Allowance dated Jun. 17, 2013; 26 pages.
U.S. Appl. No. 12/258,099; Issue Notification dated Jul. 3, 2013; 1 page.
US. Appl. No. 12/258,133; Issue Notification dated Jul. 3, 2013; 1 page.
U.S. Appl. No. 12/415,067; Issue Notification dated Sep. 25, 2013; 1 page.

* cited by examiner

BODY HEAT SENSING CONTROL APPARATUS AND METHOD

CROSS REFERENCE TO RELATED APPLICATION

This application is a continuation of application Ser. No. 12/415,067 (the "067 Application"), filed Mar. 31, 2009 by Shekhar Gupta (now U.S. Pat. No. 8,560,872) and entitled, "Body Heat Sensing Control Apparatus and Method," which is hereby incorporated by reference in its entirety.

BACKGROUND OF THE INVENTION

The disclosed invention is related to the field of electronics, and in particular to providing a body heat sensing control apparatus and method for automating features of an electronic device based on detection of a user's body heat.

SUMMARY

Embodiments of the disclosed invention include a body heat sensing control apparatus and method for automating features of an electronic device based on detection of a user's body heat. For example, in one embodiment, a data processing system is disclosed having a heat sensing mechanism for detecting the body heat of a user. In addition, the data processing system includes a data storage component for storing computer executable instructions and a processing unit for executing the computer executable instructions for enabling a user to configure one or more functions associated with the data processing system that are triggered in response to detecting the presence or absence of the user within the proximity of the data processing system using the heat sensing mechanism.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
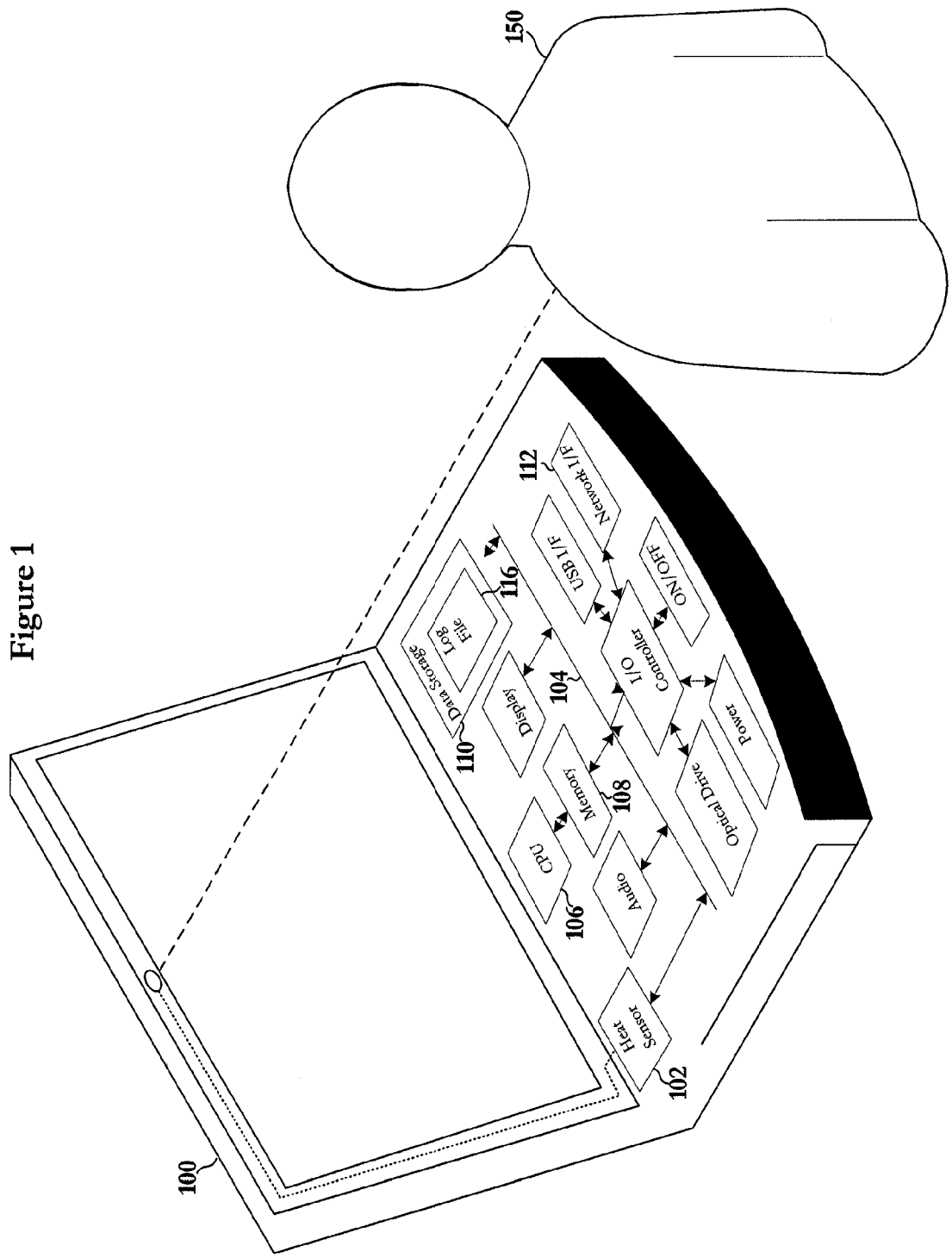
FIG. 1 depicts an embodiment a data processing system in accordance with the illustrative embodiments.

FIG. 1 depicts an embodiment of a data processing system 100 in which the illustrative embodiments may be implemented. In the depicted embodiment, data processing system 100 is a laptop/portable computer. However, in other embodiments, data processing system 100 may be, but is not limited to, a mobile/smart phone and/or a personal digital assistant (PDA), such as, but not limited to, a Blackberry® device or an iPhone®. Additionally, in some embodiments, data processing system 100 may be, but is not limited to, a set-top box coupled to a television and/or a stand-alone television unit.

In accordance with one embodiment, data processing system 100 may include a heat sensor 102 for detecting the body heat of a user 150. For example, in one embodiment, heat sensor 102 may be an infrared (IR) thermometer. An infrared thermometer measures temperature using blackbody radiation (generally infrared) emitted from objects. Infrared thermometers are sometimes called laser thermometers if a laser is used to help aim the thermometer, or non-contact thermometers to describe the device's ability to measure temperature from a distance. As depicted in FIG. 1, in one embodiment, heat sensor 102 may be utilized to detect the presence of user 150 sitting in front of data processing system 100. In other embodiments, e.g., if a processing system 100 is a set top box, heat sensor 102 may be aimed at a particular location, such as, but not limited to, a coach and/or chair for detecting the presence of user 150. The disclosed embodiments recognize certain advantages to using a heat sensor over other types of sensors, such as, but not limited to, a motion sensor, for detecting the presence of a user. For example, a motion sensor may not detect the presence of a user if the user is sitting relatively still, such as, but not limited to, when a user is watching a movie. Additionally, other advantages may include not detecting the motions/movements of other people in the room.

In other embodiments, heat sensor 102 may be any suitable device capable of detecting the body heat of a user, including, but not limited to, a thermocouple, a resistance thermometer, and/or a thermistor. For instance, in some embodiments, data processing system 100 may measure/detect the body heat of user 150 when user 150 is in physical contact with data processing system 100. For example, in one embodiment, data processing system 100 may be a personal digital assistant with a thermal/contact strip located on its side and/or back for detecting the body heat of user 150 when data processing system 100 is being held.

In accordance with one embodiment, heat sensor 102 may communicate data with other components of data processing system 100, such as, but not limited to, a processing unit 106, via system bus 104. System bus 104 provides conductive pathways/traces to mechanically support and electrically connect the various components of data processing system 100 for enabling data exchange.

Processing unit 106 may be a set of one or more processors/microprocessors or may be a multi-processor core, depending on the particular implementation. Processing unit 106 serves to execute computer executable instructions, such as, but not limited to, computer executable instructions stored in memory component 108 and/or data storage unit 110. In one embodiment, memory component 108 may be volatile memory, such as, but not limited to, random access memory, which stores currently executing computer instructions and/or other data associated with an operating system, hardware device, and/or other software applications. On the other hand, data storage unit 110 may be non-volatile memory, such as, but not limited to, a hard disk drive for storing permanent data.

In accordance with one embodiment, processing unit 106 may execute computer executable instructions for monitoring for the presence of user 150 using heat sensor 102 and for turning on data processing system 100 in response to detecting the presence of user 150. In addition, in some embodiments, processing unit 106 may execute computer executable instructions to provide an additional level of security for data processing system 100. For example, in some embodiments, data processing system 100 may be utilized by multiple users having separate user accounts (e.g., a computer lab). In these embodiments, data processing system 100 may be configured to log off a user account in response to detecting the absence of the user. In other embodiments, data processing system 100 may be configured to lock data processing system 100 until a correct password is entered, thus, preventing others from using data processing system 100.

In addition, in some embodiments, the disclosed embodiments may be utilized to conserve energy. For example, in one embodiment, data processing system 100 may be configured to immediately enable a screensaver feature associated with data processing system 100 in response to detecting the absence of a user. In other embodiments, data processing system 100 may be configured to turn off the display associated with data processing system 100 in response to detecting the absence of a user in order to conserve additional energy. Further, in some embodiments, data processing system 100 may be configured to turn off, hibernate, or place data processing system 100 in sleep/standby mode in response to the user not returning, i.e., not detected by heat sensor 102, within a specified period of time.

Additionally, in some embodiments, the disclosed embodiments may be utilized to automatically provide several convenience features to a user, including, but not limited to, disabling a screensaver feature and/or other power saving features associated with data processing system 100 in response to detecting the presence of the user. For example, in one embodiment, data processing system 100 may be configured to detect the presence of a video player playing a video (e.g., determining whether a process associated with a video player is currently executing) and in response to determining that a video player is playing a video, data processing system 100 may automatically disable the screensaver feature and/or other power saving features associated with data processing system 100. Thus, a user not actively interacting with data processing system 100, e.g., a user watching a video/movie on data processing system 100, is not disrupted with a screensaver appearing and/or with the monitor turning off and/or data processing system 100 turning off or going into sleep mode.

Further, in some embodiments, data processing system 100 may be configured to maintain a log file that tracks the time that a user is present and/or absent, such as, but not limited to, log file 116 stored in data storage unit 110. For example, in one embodiment, an employer may utilize the log file to track the amount of time an employee is actually at his desk. In some embodiments, data processing system 100 may be configured to transmit the log file to a user specified email address, e.g., a supervisor's email address. For instance, in some embodiments, data processing system 100 may include a network interface 112 for sending and receiving data. For example, network interface 112 may be, but is not limited to, a telephone modem, an Ethernet card, and/or a wireless network interface card.

Figure 2:
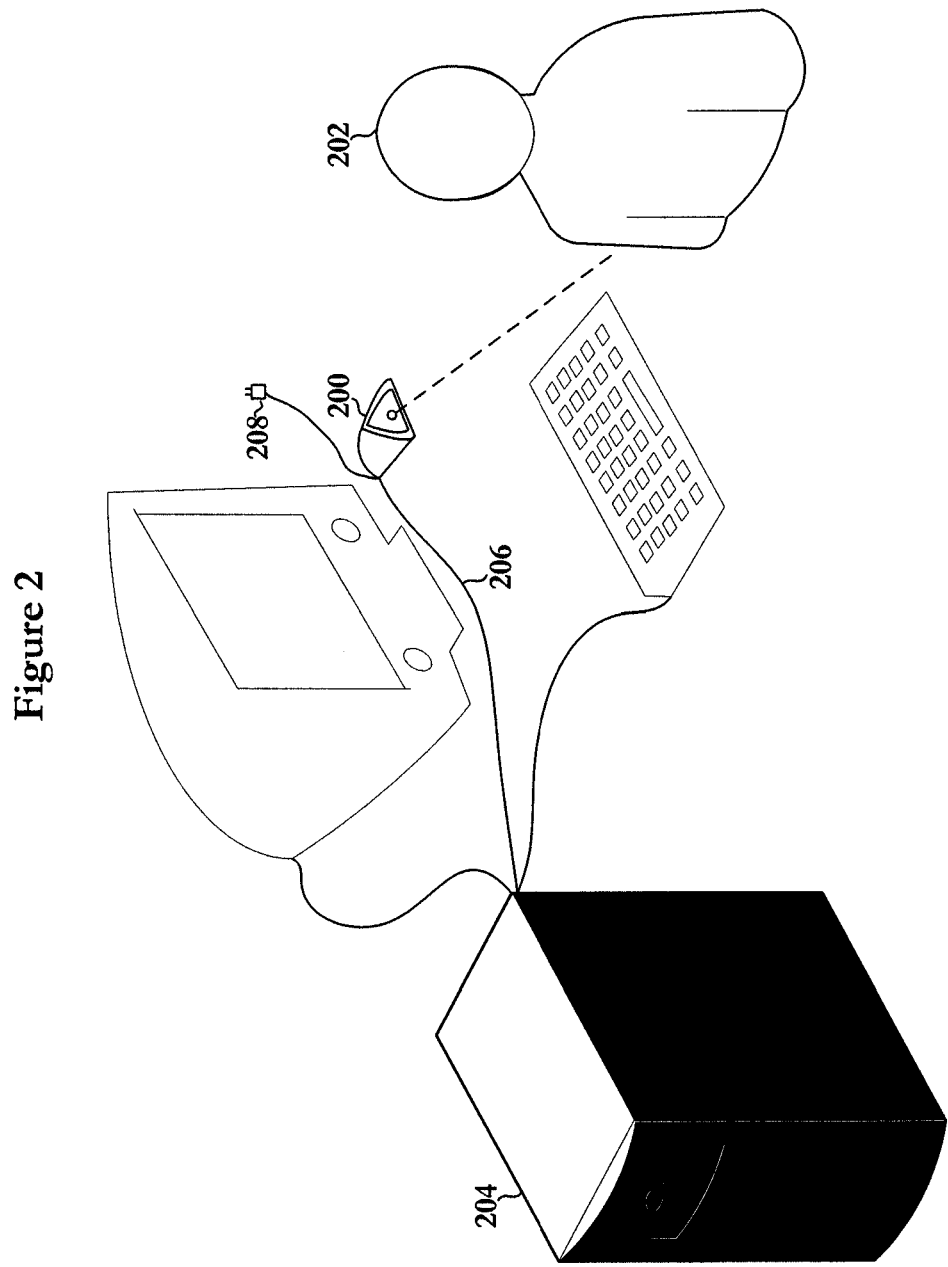
FIG. 2 depicts an embodiment of an external heat sensing mechanism in accordance with the illustrative embodiments.

With reference now to FIG. 2, an alternative embodiment is disclosed wherein an external heat sensor 200 is utilized to detect the body heat of a user 202 in accordance with the disclosed embodiments. External heat sensor 200 may comprise any suitable device capable of detecting the body heat of a user, including, but not limited to, an infrared (IR) thermometer. In the disclosed embodiment, external heat sensor 200 is communicatively coupled to a data processing system 204 via a wired connection 206. For example, in one embodiment, external heat sensor 200 may be communicatively coupled to a data processing system 204 via a universal serial bus (USB) connection. Alternatively, in some embodiments, external heat sensor 200 may communicate with data processing system 204 via a wireless transceiver, such as, a radio frequency (RF) transceiver.

In some embodiments, external heat sensor 200 may be a plug and play device that is automatically recognized and configured by data processing system 204 when communication is established between data processing system 204 and external heat sensor 200, e.g., when external heat sensor 200 is plugged into a USB port of data processing system 204. For instance, in one embodiment, an operating system associated with data processing system 204 may already include the drivers/software needed to establish communication between external heat sensor 200 and data processing system 204. In other embodiments, external heat sensor 200 may have built-in drivers/software that is installed on data processing system 204 when a connection is established. Alternatively, in some embodiments, a user of data processing system 204 may manually install the drivers/software on data processing system 204 for enabling communication with external heat sensor 200.

In addition, in some embodiments, external heat sensor 200 may include an AC adapter for converting the electrical energy received from an electric plug 208 to an appropriate voltage or current to power external heat sensor 200. In other embodiments, external heat sensor 200 may be powered by an internal power source, such as, but not limited to, an alkaline battery or a lithium battery. Alternatively, in some embodiments, external heat sensor 200 may receive power from data processing system 204 via wired connection 206.

Figure 3:
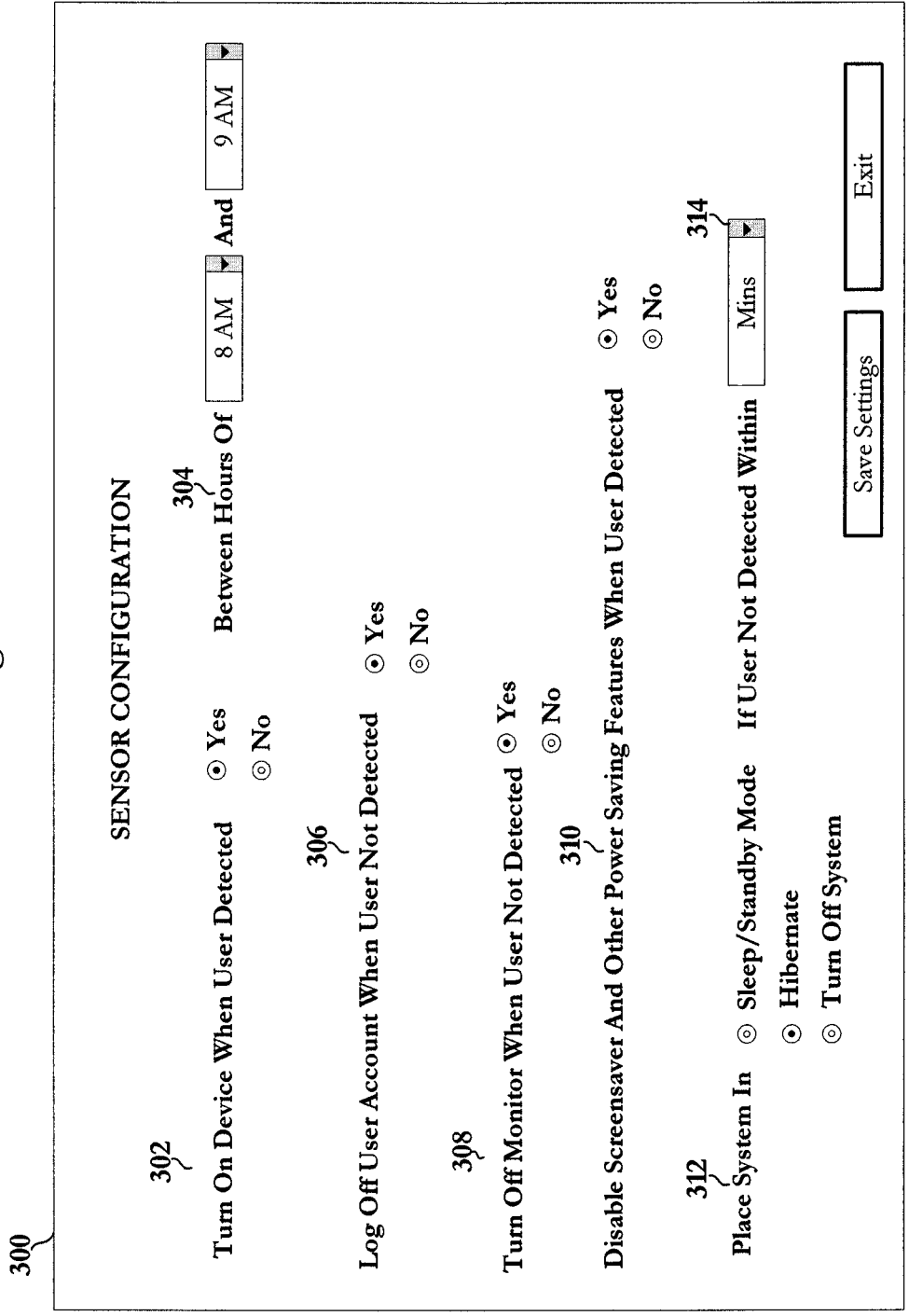
FIG. 3 depicts an embodiment of a user interface for enabling a user to configure one or more functions associated with the data processing system in accordance with the illustrative embodiments.

FIG. 3 depicts an embodiment of a user interface 300 for enabling a user to configure one or more functions associated with a data processing system, such as, but not limited to, data processing system 100 and/or data processing system 204, in accordance with the illustrative embodiments. For instance, in one embodiment, processing unit 106 may execute computer executable instructions installed on data processing system 100 for generating user interface 300. In the depicted embodiment, user interface 300 includes several user selectable options for automating features associated with a data processing system based on detecting a user's presence using a heat sensor.

For instance, in the depicted embodiment, user interface 300 includes a turn on device when a user is detected option 302 for enabling automatic powering on of a device. For example, a user may desire that his computer be turned on in the morning upon detection of him entering his office. In some embodiments, a user may also specify a time parameter 304 for turning on the device only during a specified time. For example, a user may enable the automatic turn on feature only between the hours of 8 AM and 9 AM, i.e., the normal time the user arrives at the office. Thus, the disclosed embodiments prevents a device from powering on when the user is not present, e.g., during the evening hours when a cleaning service personnel is in the office.

In addition, in some embodiments, user interface 300 may include a log off user account when user is not detected option 306 to prevent others from using the data processing system/device under the user's user account when the user is not present. In some embodiments, other users may utilize the data processing system/device under a different user account. Alternatively, in some embodiments, the data processing system/device is locked after a user account is logged off until a correct pin/password is entered, thereby, preventing any other person from utilizing the data processing system/device.

In some embodiments, user interface 300 may include one or more power saving features, such as, but not limited to, a turn off monitor when user is not detected option 308 for automatically turning off and/or blackening a display associated with a data processing system/device to conserve power and protect privacy. In addition, in some embodiments, user interface 300 may include an option 312 for placing the system in a user desired mode, such as, but not limited to, sleep/standby mode, hibernate mode, or turning off the system, if a user's presence is not detected within a specified period. Additionally, in some embodiments, user interface 300 may include an option 314 for enabling a user to select the specified period of time for placing the data processing system/device in one of the above modes.

In addition, in some embodiments, user interface 300 may include an option 310 for disabling a screensaver feature and/or other power saving features, such as, but not limited to, turning off a monitor and/or putting the system in sleep mode, when a user's presence is detected. For example, a user may desire that the screensaver function may be automatically disabled while a user is present. Alternatively, or in addition to, in some embodiments, a screensaver function may be automatically disabled if a media player application is currently executing while a user presence is detected, e.g., when a user is watching a movie on the data processing system/device. Thus, a user's viewing experience is not interrupted by a screensaver or by the monitor and/or the data processing system turning off.

Figure 4:
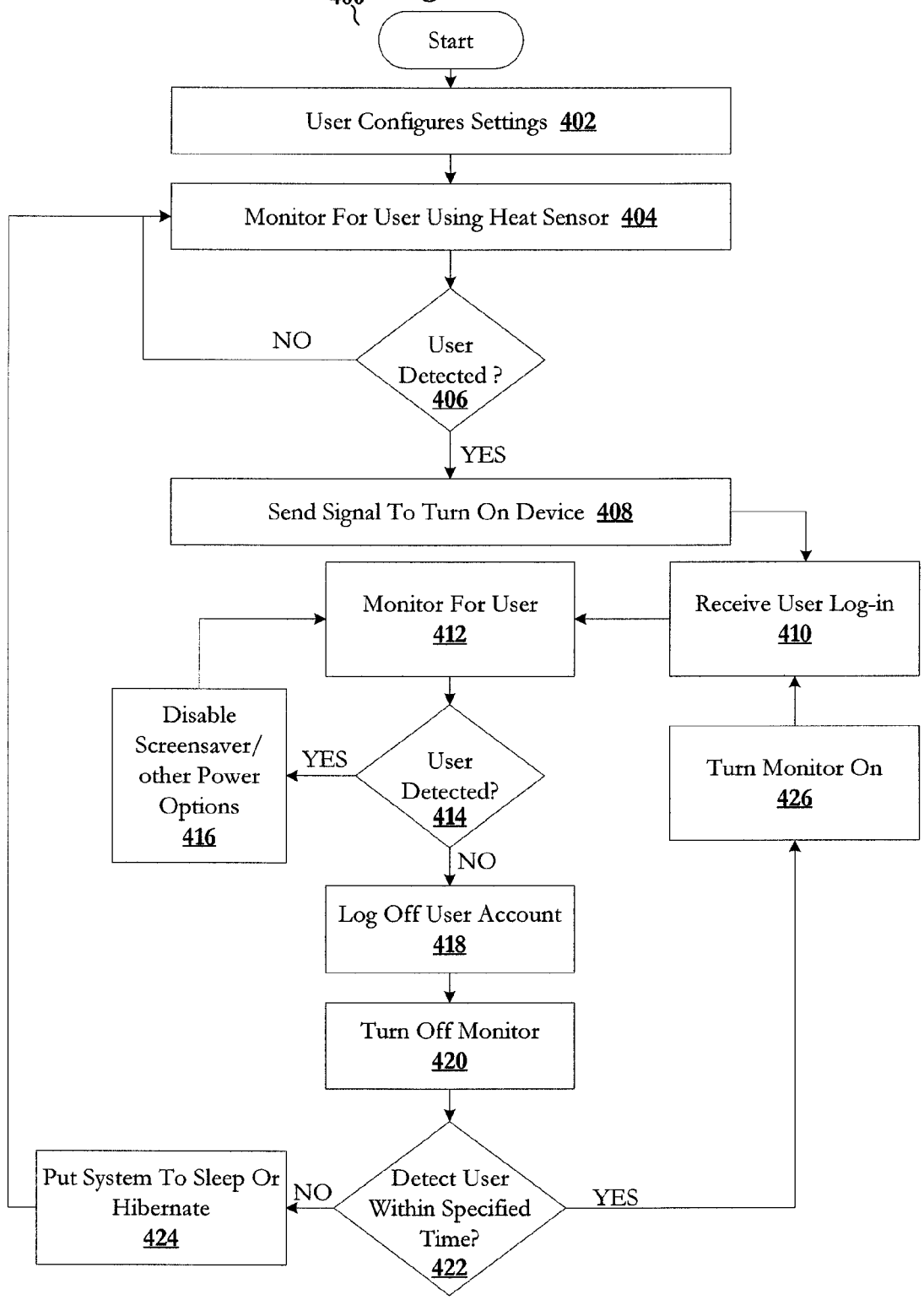
FIG. 4 depicts a flowchart illustrating an embodiment of a process for automating features of an electronic device in accordance with the illustrative embodiments.

With reference now to FIG. 4, a flowchart illustrating an embodiment of a process 400 for automating features of an electronic device is presented in accordance with the illustrative embodiments. Process 400 may be executed by a processor of a data processing system/device, such as, processing unit 106 of data processing system 100. Process 400 begins, at step 402, by configuring the data processing system/device using configuration settings received from a user. At step 404, the process monitors for a user's presence utilizing a heat sensor device associated with the data processing system/device. The process determines, at step 406, whether a user's presence is detected. If a user's presence is detected, the process sends a signal to initiate powering on the data processing system/device at step 408. At step 410, the process receives a user's login information, such as, but not limited to, a pin/password and/or a combination of a user name and password.

At step 412, the process continues to monitor for the presence of the user. In one embodiment, if the process determines that a user is present at step 414, the process, at step 416, may disable a screensaver function and/or other power saving features associated with the data processing system/device. In some embodiments, if the process does not detect the presence of the user, the process, at step 418, logs the user out of a user account on the device. Additionally, in some embodiments, the process may, at step 420, turn off/blacken a display associated with the data processing system/device to conserve energy.

Further, in some embodiments, the process may, at step 422, determine whether a user has been absent for a specified period of time. If the process determines that the user has been absent for the specified period of time, the process may, at step 424, place the system into a sleep/standby mode until a user's presence is detected at step 406. In one embodiment, if the process determines, at step 422, that a user has returned within the specified time, the process turns the monitor/display back on at step 426. At step 410, the process receives the user's logon information and repeats the process at step 412.

Figure 5:
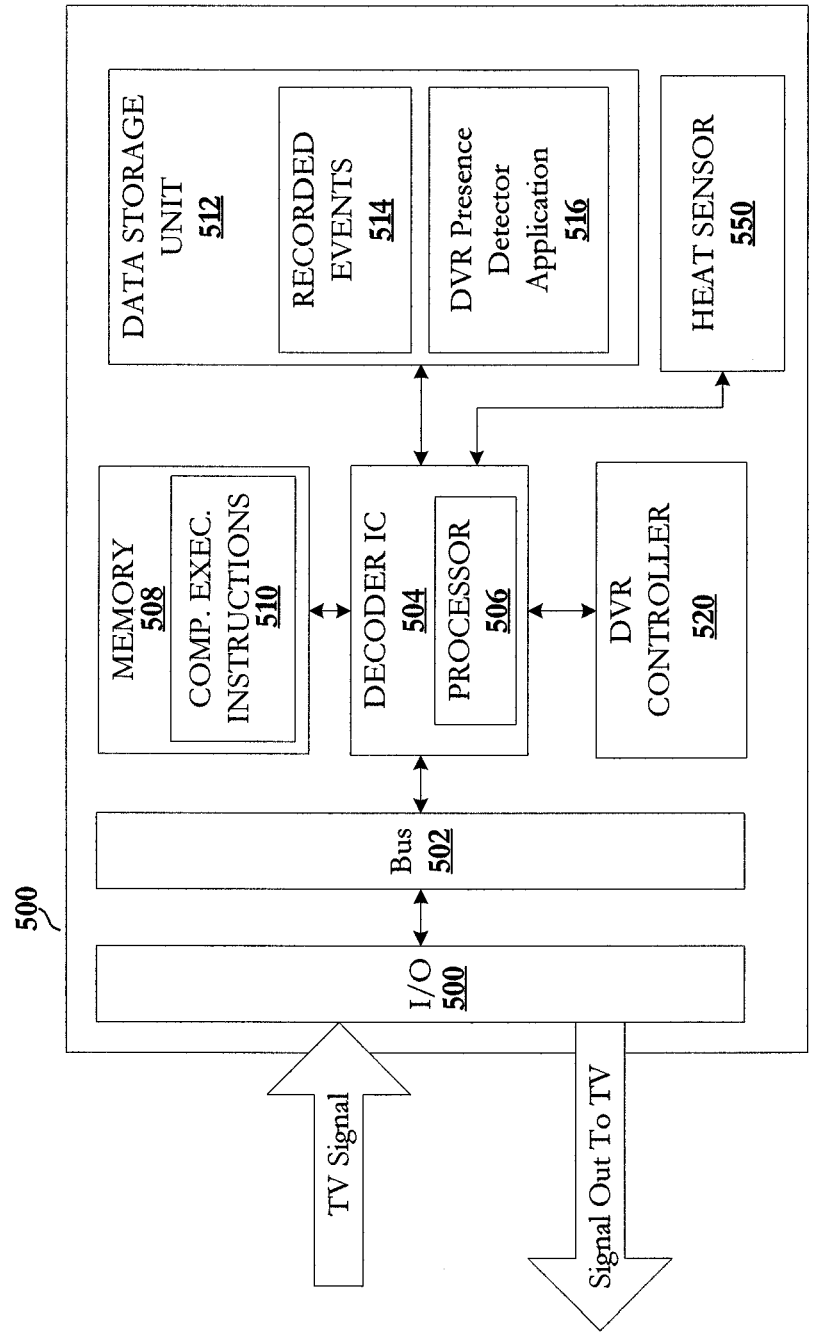
FIG. 5 depicts an embodiment of a set top box in accordance with the disclosed embodiments.

FIG. 5 depicts an embodiment of a set top box 500 in accordance with the disclosed embodiments. In one embodiment, set top box 500 may include a set of input/output ports 500 for receiving television content via cable, satellite, Internet, and/or over the air broadcasting. For example, in some embodiments, the set of input/output ports 500 may include an Ethernet port for connecting set top box 500 to a broadband Internet source for receiving IPTV services and other Internet data. In addition, in some embodiments, the set of input/output ports 500 may provide connection ports for coupling set top box 500 to one or more electronic devices. For example, in one embodiment, the set of input/output ports 500 may include a video output interface, such as, but not limited to, a coaxial cable connection for coupling set top box 500 to a display/television unit. Additionally, in some embodiments, the set of input/output ports 500 may include other connector ports, such as, but not limited to, a 1594 port, a universal serial bus (USB) port, and/or a high-definition multimedia interface (HDMI).

In one embodiment, the set of input/output ports 500 communicates with other components of set top box 500 via a system bus 502. System bus 502 provides conductive pathways/traces to mechanically support and electrically connect the various components of set top box 500 for enabling viewing and recording of television content.

Additionally, in the depicted embodiment, set top box 500 includes a video decoder integrated circuit 504 for decoding video. In some embodiments, video decoder integrated circuit 504 may include one or more microprocessors 506. In some embodiments, video decoder integrated circuit 504 may support the H.264 standard for video compression and/or other types of video compression, such as, but not limited to, a Moving Picture Experts Group-X (MPEG-X) standard, e.g., MPEG-2 and MPEG-4.

In addition, set top box 500 may include a memory component 508. For instance, in some embodiments, memory component 508 may be volatile memory, i.e., memory that loses its contents when set top box 500 loses power. For example, in some embodiments, memory component 508 may be random access memory (RAM). Random access memory stores currently executing instructions 510 and/or other data utilized by an operating system, software program and/or hardware device.

Set top box 500 may also contain one or more data storage units 512. Data storage unit 512 may be non-volatile memory, such as, but not limited to, a hard disk drive. Non-volatile memory retains stored data when power is lost. In some embodiments, data storage unit 512 may be an external hard drive and/or a removable data storage unit. Additionally, in some embodiments, data storage unit 512 may store a plurality of recorded events/television programs 514. Set top box 500 may include a DVR controller module 520 for controlling the recording and playback of the plurality of recorded events/television programs 514.

In addition, in one embodiment, data storage unit 512 may include a digital video recorder presence detector application 516. In accordance with some embodiments, digital video recorder presence detector application 516 comprises of computer instructions for enabling set top box 500 to perform automated features based on the detection or absence of a user. For example, in one embodiment, set top box 500 may include a heat sensor 550 for detecting the presence of a user. In some embodiments, heat sensor 550 may include an array of sensors directed towards different locations, such as, but not limited to, a plurality of seating areas in front of a television set. Alternatively, in some embodiments, heat sensor 500 may rotate periodically, e.g., every 5 seconds, to different preset locations within a viewing area for detecting the presence or absence of one or more users. For instance, in one embodiment, digital video recorder presence detector application 516 may include executable instructions for enabling a user to configure set top box 500 to toggle on or off set top box 500 and/or a television unit coupled to set top box 500 in response to detecting the presence or absence of a user. In other embodiments, digital video recorder presence detector application 516 may include executable instructions for enabling a user to configure set top box 500 to automatically pause the playing of the television show in response to detecting the absence of a user (e.g., the user gets up to get a snack or to answer a telephone call) and for automatically restart playing of the television show in response to detecting the presence of the user.

Accordingly, embodiments of the disclosed invention include a body heat sensing control apparatus (e.g., a data processing system with an internal and/or external heat sensor) and a method for automating features of the data processing system based on detection of a user's body heat. For example, in one embodiment, a data processing system is disclosed having a heat sensing mechanism for detecting the body heat of a user. In addition, the data processing system includes a data storage component for storing computer executable instructions and a processing unit for executing the computer executable instructions for enabling a user to configure one or more functions associated with the data processing system that are triggered in response to detecting the presence or absence of the user within the proximity of the data processing system using the heat sensing mechanism.

As will be appreciated by one skilled in the art, certain aspects of the disclosed embodiments may be embodied as a system, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

What is claimed is:

1. A computer implemented method for automating features of a data processing system based on detection of a user's body heat, the method comprising:

providing a physically separate freestanding external heat sensor;

placing the physically separate freestanding external heat sensor into digital communication with the data processing system;

accepting input to the data processing system from a user, said input enabling an automatic toggling of a power mode of the data processing system during a specified time period said input further disabling the automatic toggling of the power mode of the data processing system before or after the specified time period;

during the specified time period, monitoring for the presence of a user using the physically separate freestanding sensor in communication with the data processing system;

maintaining a log file that includes a time and date that the presence of the user is detected via the heat sensor; and responsive to detecting the presence of the user during the specified time period, automatically toggling a power mode of the data processing system.

2. The computer implemented method of claim 1, further comprising performing one or more user specified actions associated with the data processing system based on whether the presence of the user is detected via the heat sensor.

3. The computer implemented method of claim 1, further comprising logging off a user account associated with the user in response to detecting the absence of the user.

4. The computer implemented method of claim 1, further comprising responsive to detecting the absence of the user, locking use of the data processing system until a correct password is entered.

5. The computer implemented method of claim 1, further comprising disabling a screensaver function while the presence of the user is detected.

6. The computer implemented method of claim 1, further comprising disabling a screensaver function while the data processing system is playing a media file and the presence of the user is detected.

7. The computer implemented method of claim 1, further comprising turning off a display associated with the data processing system in response to detecting the absence of the user.

8. The computer implemented method of claim 1, further comprising placing the data processing system in a user specified mode in response to detecting the absence of the user for a specified time.

9. The computer implemented method of claim 8, wherein the user specified mode includes a standby mode, a hibernate mode, and a turn off the data processing system mode.

10. The computer implemented method of claim 1, further comprising transmitting the log file to a user specified email address.

11. The computer implemented method of claim 1, wherein the data processing system is a personal digital assistant (PDA).

12. A system comprising:
a physically separate freestanding external heat sensor for detecting the body heat of a user; and
a data processing system in communication with the physically separate freestanding external heat sensor, the data processing system comprising:
a user interface configured to accept input to the data processing system from a user, said input enabling an automatic toggling of a power mode of the data processing system during a specified time period, said input further disabling the automatic toggling of the power mode of the data processing system before or after the specified time period;
a data storage unit for storing computer executable instructions; and
a processing unit for executing the computer executable instructions for automatic toggling a power mode of the data processing system in response to detecting the presence of the user during the specified time period and within a proximity of the data processing system using the heat sensor said processing system further executing the computer executable instructions to maintain a log file that includes a time and date that the presence of the user is detected via the heat sensor.

13. The data processing system of claim 12, wherein the data processing system is a laptop computer.

14. The data processing system of claim 12, wherein the data processing system is a set-top box.

15. The data processing system of claim 12, wherein the data processing system is a personal digital assistant (PDA).

16. A computer program product comprising a non-transitory computer usable medium, said computer usable medium storing computer usable program code for:
accepting input to a data processing system from a user, said input enabling an automatic toggling of a power mode of the data processing system during a specified time period said input further disabling the automatic toggling of the power mode of the data processing system before or after the specified time period;
during the specified time period monitoring for the presence of a user using a physically separate freestanding external heat sensor in communication with the data processing system;
maintaining a log file that includes a time and date that the presence of the user is detected via the heat sensor; and
automatically toggling a power mode of the data processing system in response to detecting the presence or absence of the user during the specified time period.

* * * * *